United States Patent
Matsufuji et al.

(10) Patent No.: US 12,539,754 B2
(45) Date of Patent: Feb. 3, 2026

(54) TRANSMISSION FOR WORK VEHICLE

(71) Applicant: JINMYUNG POWERTECH CO., LTD., Siheung-si (KR)

(72) Inventors: Mizuya Matsufuji, Sanda (JP); Hyang Hui Lee, Incheon (KR); Sang Woo Shin, Incheon (KR)

(73) Assignee: JINMYUNG POWERTECH CO., LTD., Siheung-si (KR)

(*) Notice: Subject to any disclaimer, the term of this patent is extended or adjusted under 35 U.S.C. 154(b) by 0 days.

(21) Appl. No.: 18/712,690

(22) PCT Filed: Nov. 19, 2022

(86) PCT No.: PCT/IB2022/061175
§ 371 (c)(1),
(2) Date: May 22, 2024

(87) PCT Pub. No.: WO2023/094958
PCT Pub. Date: Jun. 10, 2023

(65) Prior Publication Data
US 2025/0010705 A1   Jan. 9, 2025

(30) Foreign Application Priority Data

Nov. 23, 2021 (KR) .................. 10-2021-0162843

(51) Int. Cl.
*F16H 61/00* (2006.01)
*B60K 17/02* (2006.01)
*F16H 57/04* (2010.01)

(52) U.S. Cl.
CPC ......... *B60K 17/02* (2013.01); *F16H 57/0435* (2013.01); *F16H 61/0009* (2013.01); *F16H 2061/0034* (2013.01)

(58) Field of Classification Search
CPC ............. F16H 57/0435; F16H 61/0009; F16H 2061/0034; B60K 17/02
See application file for complete search history.

(56) References Cited

U.S. PATENT DOCUMENTS 5,599,247 A * 2/1997 Matsufuji ............. B60K 17/28
74/335
6,044,720 A * 4/2000 Matsufuji ............. B60K 17/08
74/330

(Continued)

FOREIGN PATENT DOCUMENTS

JP 2000-158962   6/2000
JP 2000193073 A * 7/2000 ............. F16H 3/093

(Continued)

OTHER PUBLICATIONS

International Search Report for International Application No. PCT/IB2022/061175 date Feb. 23, 2023.

*Primary Examiner* — William C Joyce
(74) *Attorney, Agent, or Firm* — Kunzler Bean & Adamson (57) ABSTRACT

A transmission for a work vehicle that includes a switching clutch for switching to forward and backward movement and a shifting clutch for shifting includes: a first shaft having the switching clutch mounted thereon; a second shaft rotating forward or backward in linkage with the first shaft and having the shifting clutch mounted thereon; a supporting member mounted in the housing and rotatably supporting the first shaft and the second shaft; a switching hydraulic valve device mounted on a first wall of the housing close to the switching clutch and controlling the switching clutch; and a shifting hydraulic valve device mounted on a second wall of the housing close to the shifting clutch and controlling the shifting clutch, in which the switching hydraulic valve device and the shifting hydraulic valve device may be (Continued)

connected to the switching clutch and the shifting clutch through channels formed in the supporting member.

8 Claims, 10 Drawing Sheets

(56) References Cited

U.S. PATENT DOCUMENTS

| | | | | |
|---|---|---|---|---|
| 6,199,653 | B1* | 3/2001 | Matsufuji | B60K 17/35 |
| | | | | 192/85.37 |
| 6,269,927 | B1* | 8/2001 | Kanenobu | F16H 63/3026 |
| | | | | 192/48.601 |
| 6,487,924 | B2* | 12/2002 | Matsufuji | F16H 57/021 |
| | | | | 74/330 |
| 9,003,908 | B2* | 4/2015 | Sagawa | B60K 20/00 |
| | | | | 74/473.19 |

FOREIGN PATENT DOCUMENTS

| | | |
|---|---|---|
| JP | 2009-208554 | 9/2009 |
| JP | 2020-152364 | 9/2020 |
| KR | 10-1240817 | 3/2013 |
| KR | 10-1688869 | 12/2016 |

* cited by examiner

TRANSMISSION FOR WORK VEHICLE

TECHNICAL FIELD

The present disclosure relates to a transmission and, in more detail, a transmission for a work vehicle, the transmission making it possible to optimize a valve device and simplify an oil supply circuit when designing a wet clutch of a transmission.

BACKGROUND ART

A work vehicle may mean a vehicle that can additionally perform work for convenience of human life in a vehicle for moving. A work vehicle can function as a transport device that moves workers to specific positions using a driving source such as an engine and can use the power from a driving source for purposes other than running while moving with workers or maintaining a stop state at specific positions.

As general work vehicles, there may be agricultural work vehicles such as a combine or a tractor and there may also be work vehicles that perform different kinds of work at a construction site, a factory, or the like.

Referring to Japanese Patent No. 940195, a work vehicle including a PTO has been disclosed therein. The work vehicle includes an engine, a transmission, and a PTO device, in which a portion of power from the engine is transmitted to driving wheels, etc. and used for running and the other is transmitted to the PTO device, etc. and can be used for purposes other than running.

The transmission includes a front housing, a transmission housing, and a rear housing, and includes, therein, a running power transmission unit that transmits power from the engine to the driving wheel, etc. and a PTO power transmission unit for work other than running. As the running power transmission unit, a switching unit, a main shifting unit, and a sub-shifting unit are included. The switching unit is positioned at the front housing, the main shifting unit and the sub-shifting unit are positioned at the transmission housing, and a front-wheel driving case is positioned under the transmission housing, whereby it is possible to selectively transmit power to a transmission shaft.

A PTO device of the related art also includes a PTO clutch and controls the PTO clutch using hydraulic pressure. However, a hydraulic PTO clutch and a controller thereof are installed far from each other in many cases in the related art, and a loss of pressure accompanies, so a hydraulic control curve that is controlled by a hydraulic control device is substantially differently applied to piston hydraulic pressure of an PTO clutch in some cases.

Further, since a switching unit is operated by hydraulic pressure, a control valve device is provided under a front housing and may be used to control a hydraulic clutch of the switching unit by receiving working fluid from a hydraulic pump.

DISCLOSURE

Technical Problem

The present disclosure provides a transmission for a work vehicle, the transmission including a switching unit, a main shifting unit, etc., which include a wet clutch, and providing a switching hydraulic valve device and a shifting hydraulic valve device for controlling the clutches in a simple and optimized structure.

The present disclosure provides a transmission for a work vehicle, the transmission connecting a switching hydraulic valve device and a shifting hydraulic valve device with a hydraulic clutch and being able to achieve both shaft supporting and oil feeding through one supporting member.

The present disclosure provides a transmission for a work vehicle, the transmission connecting a switching hydraulic valve device and a shifting hydraulic valve device to one hydraulic pump and being able to stably maintain control pressure even though the shifting hydraulic valve device is indirectly connected with the hydraulic pump.

The present disclosure provides a transmission for a work vehicle, the transmission making it possible to easily link a clutch pedal and a switching unit and configure wiring by disposing a switching hydraulic valve device at the left side of the transmission and making it possible to achieve easy wiring according to operation of a main shift lever by disposing a shifting hydraulic valve device at the right side of the transmission.

Technical Solution

According to an exemplary embodiment of the present disclosure for achieving the objectives of the present disclosure described above, a transmission for a work vehicle that includes a switching clutch for switching to forward and backward movement and a shifting clutch for shifting includes: a first shaft having the switching clutch mounted thereon; a second shaft rotating forward or backward in linkage with the first shaft and having the shifting clutch mounted thereon; a supporting member mounted in the housing and rotatably supporting the first shaft and the second shaft; a switching hydraulic valve device mounted on a first wall of the housing close to the switching clutch and controlling the switching clutch; and a shifting hydraulic valve device mounted on a second wall of the housing close to the shifting clutch and controlling the shifting clutch, in which the switching hydraulic valve device and the shifting hydraulic valve device may be connected to the switching clutch and the shifting clutch through channels formed in the supporting member.

The switching hydraulic valve device may be mounted on a left wall of the housing close to the first shaft and the shifting hydraulic valve device may be mounted on a right wall of the housing close to the second shaft. According to an embodiment, the first shaft is disposed on an upper shaft line of the transmission and the second shaft is disposed on a lower shaft line of the transmission, whereby it is possible to easily form a hydraulic circuit in which the switching hydraulic valve device and the shifting hydraulic valve device are sequentially connected from a hydraulic pump.

The switching hydraulic valve device may include a switching valve block mounted on the first wall of the housing, a switching control valve mounted on the switching valve block, and at least two first pipes connecting the switching hydraulic control valve and the supporting member. When the switching hydraulic valve device is positioned at the right side of the housing of the transmission, the switching hydraulic valve device may be positioned at the upper portion to substantially correspond to the height of the first shaft and can control operation of the switching clutch through the first pipes.

The shifting hydraulic valve device may be provided opposite to the switching hydraulic valve device. The shifting hydraulic valve device also may include a shifting valve block mounted on the second wall of the housing, a plurality of shifting control valves mounted on the shifting valve block, and a plurality of second pipes connecting the shifting control valves and the supporting member. When the shifting hydraulic valve device is positioned at the right side of the housing, the shifting hydraulic valve device may be mounted to correspond to the height of the second shaft and can control operation of a shifting clutch, for example, a high-speed/low-speed hydraulic clutch or a main shifting hydraulic clutch through the second pipes.

In the valve device, pipes may be connected to oil outlets of the devices, respectively, and sealing is formed at the ends of the pipes, so the pipes can be mounted to be able to be sealed with the supporting member while they are inserted into the transmission.

A plurality of through-holes corresponding to the pipes, respectively, may be formed through a wall of the transmission to pass pipes connected to the switching valve block and the shifting valve block. The through-hole may be integrated into one hole in a size that can pass all of pipes, but the through-holes may be separately formed to be able to support the pipes, respectively, in order to stably support and guide the pipes.

In the shifting hydraulic valve device, the shifting control valve may be mounted on the lower portion of the shifting valve block, a shifting oil inlet may be formed on the upper portion of the shifting valve block opposite to the shifting control valve, and an accumulator may be formed in an oil pipe for supplying oil to the oil inlet from the oil pump or another hydraulic device.

A plurality of shifting control valves may be mounted on the shifting valve block and they may be modularized and mounted in the transmission.

The housing may be provided by assembling a front housing, a transmission housing, a differential housing, and a rear housing. The switching clutch and the high-speed/low-speed hydraulic clutch may be accommodated in the front housing and a main shifting hydraulic clutch is accommodated in the transmission housing. The high-speed/low-speed hydraulic clutch and the main shifting hydraulic clutch are clutches constituting the main shifting unit, are separated from each other, and may be connected to a third shaft on the upper shaft line, but, depending on cases, they all may be formed on one second shaft.

An oil outlet of the switching hydraulic valve device may be connected with the oil inlet of the shifting hydraulic valve device by an oil pipe, an accumulator may be connected to the oil pipe, and the switching hydraulic valve device may be positioned higher than the shifting hydraulic valve device.

In the switching hydraulic valve device and the shifting hydraulic valve device according to an embodiment, a control valve may be a hydraulic proportional control valve or an on-off control valve, and a plurality of pressure sensors mounted on the valve block to correspond to the control valves, respectively, is included, whereby it is possible to sense pressure variation according to the control valves.

A relief valve may be mounted on at least one of the switching hydraulic valve device and the shifting hydraulic valve device. When a relief valve is mounted on the switching hydraulic valve device, a relief valve may be omitted at the shifting hydraulic valve device, but this may be determined in accordance with the switching hydraulic valve device is a mechanical type or an electronic control type, and a relief valve may also be formed on one or both of the valve devices.

The shifting hydraulic valve device may have a manifold structure for supplying oil back to different hydraulic devices of the work vehicle or for forming hydraulic pressure, and the different hydraulic devices may be a PTO hydraulic clutch, a differential lock, a front-wheel driving device, etc.

Advantageous Effects

According to the transmission of the present disclosure, the switching unit, the main shifting unit, etc. can be configured by hydraulic clutches that can be electronically controlled and it is possible to design the switching hydraulic valve device and the shifting hydraulic valve device for effectively controlling the clutches in a simple and optimized structure.

According to the transmission of the present disclosure, it is possible to connect the switching hydraulic valve device and the shifting hydraulic valve device with a hydraulic clutch and achieve both shaft supporting and oil feeding through one supporting member.

According to the transmission of the present disclosure, it is possible to connect the switching hydraulic valve device and the shifting hydraulic valve device to one hydraulic pump, and even though one hydraulic pump is used, it is possible to stably maintain control pressure of oil at the shifting hydraulic valve device positioned a relatively downstream side.

According to the transmission of the present disclosure, it is possible to easily link a clutch pedal and a switching unit and configure wiring by disposing the switching hydraulic valve device at the left side of the transmission and to achieve easy wiring according to operation of a main shift lever by disposing the shifting hydraulic valve device at the right side of the transmission.

MODE FOR INVENTION

Hereafter, preferred embodiments of the present disclosure will be described in detail with reference to the accompanying drawings, but the present disclosure is not limited or restricted to the embodiments. For reference, the same reference numerals substantially indicate the same components in the description, it is possible to refer to the matters shown in other figures under this rule, and matters that are determined as being apparent or repetitive to those skilled in the art may be omitted.

Figure 1:
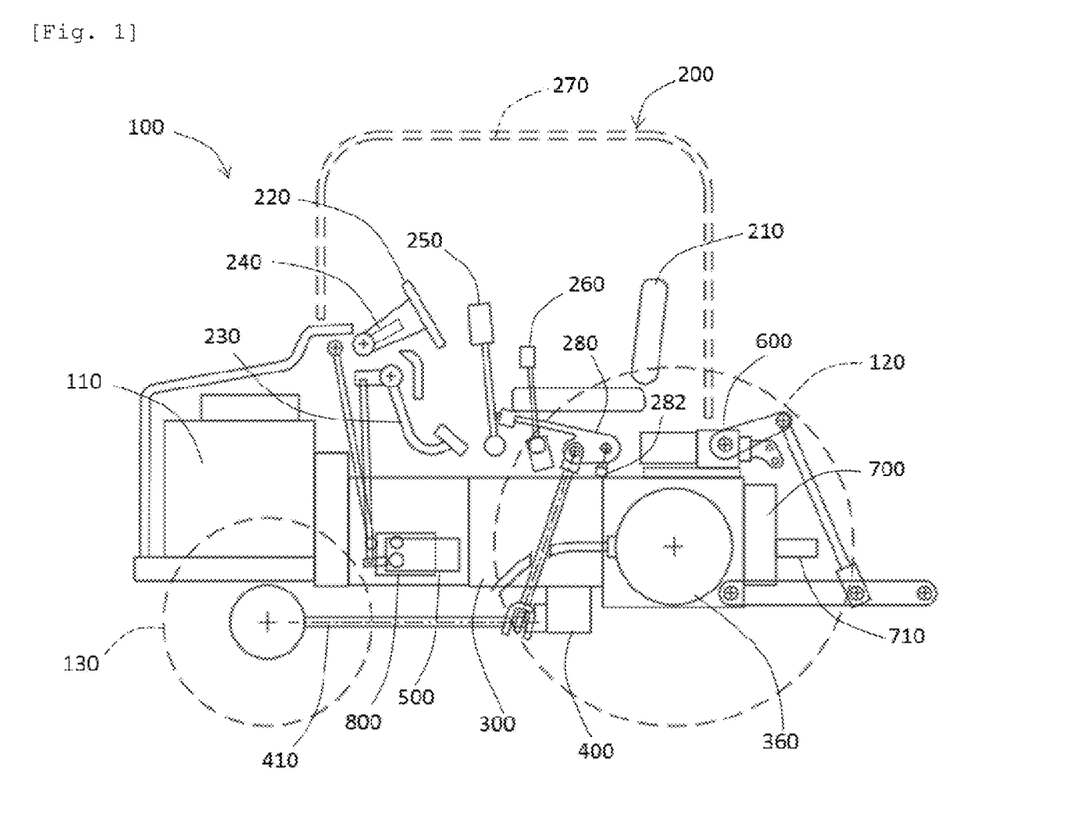
FIG. 1 is a view illustrating a transmission according to an embodiment of the present disclosure and a work vehicle including the transmission.
Figure 2:
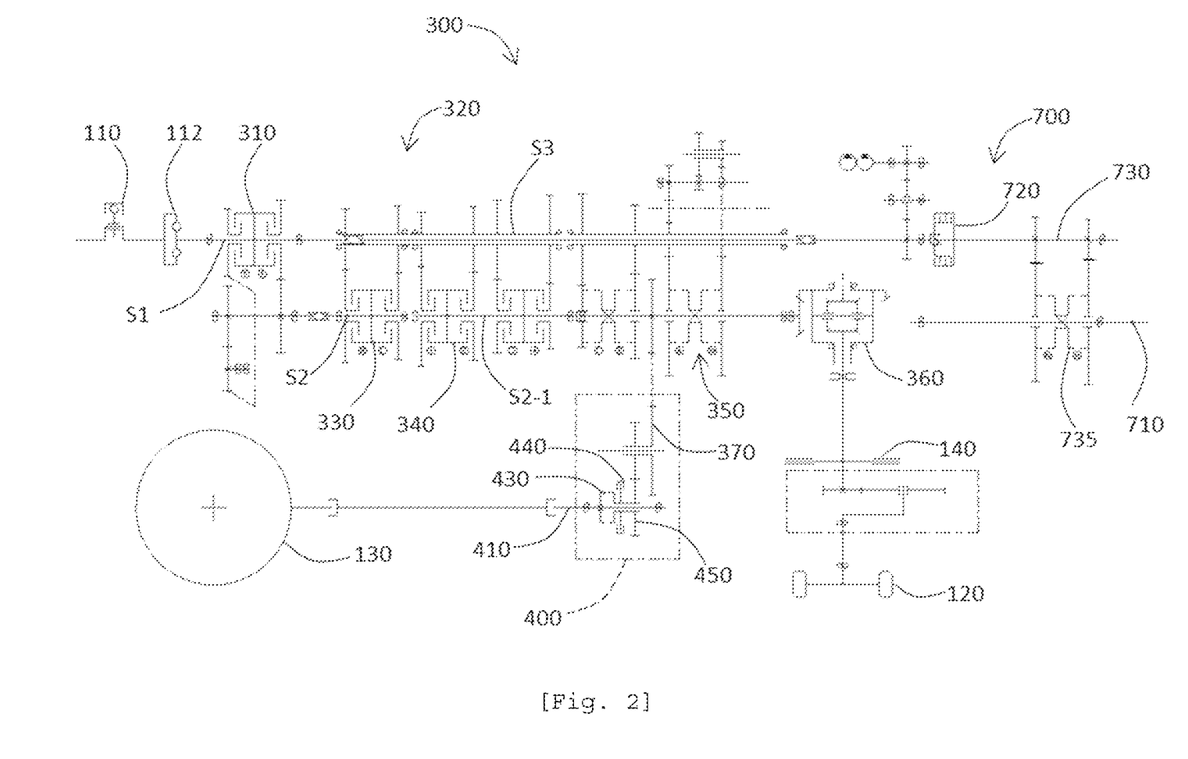
FIG. 2 is a view illustrating a power transmission structure of the work vehicle of FIG. 1.
Figure 3:
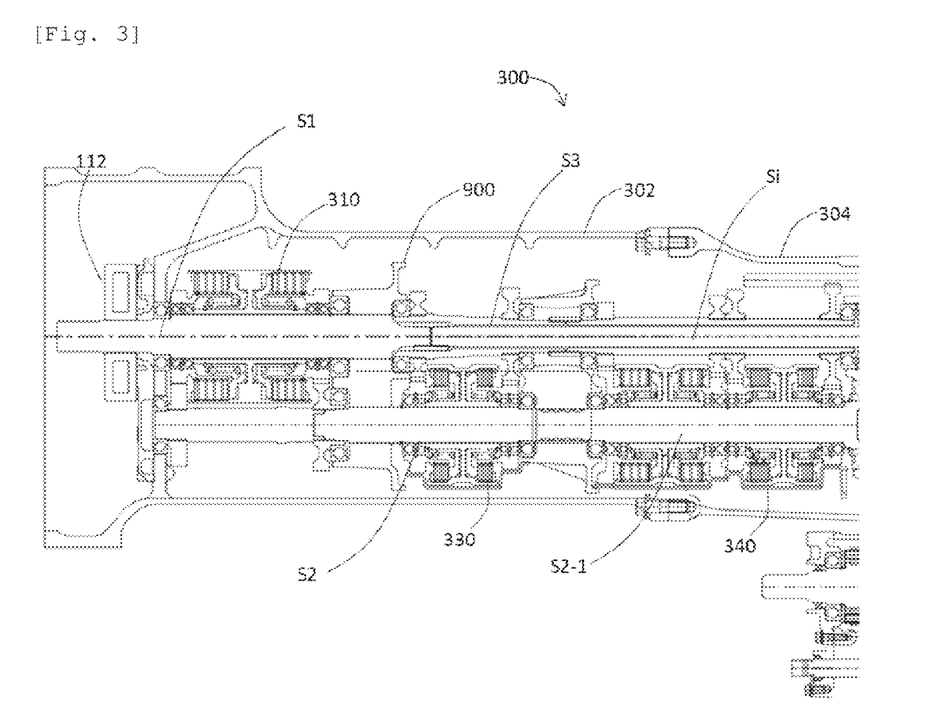
FIG. 3 is a view illustrating the internal structure of the transmission of FIG. 1.
Figure 4:
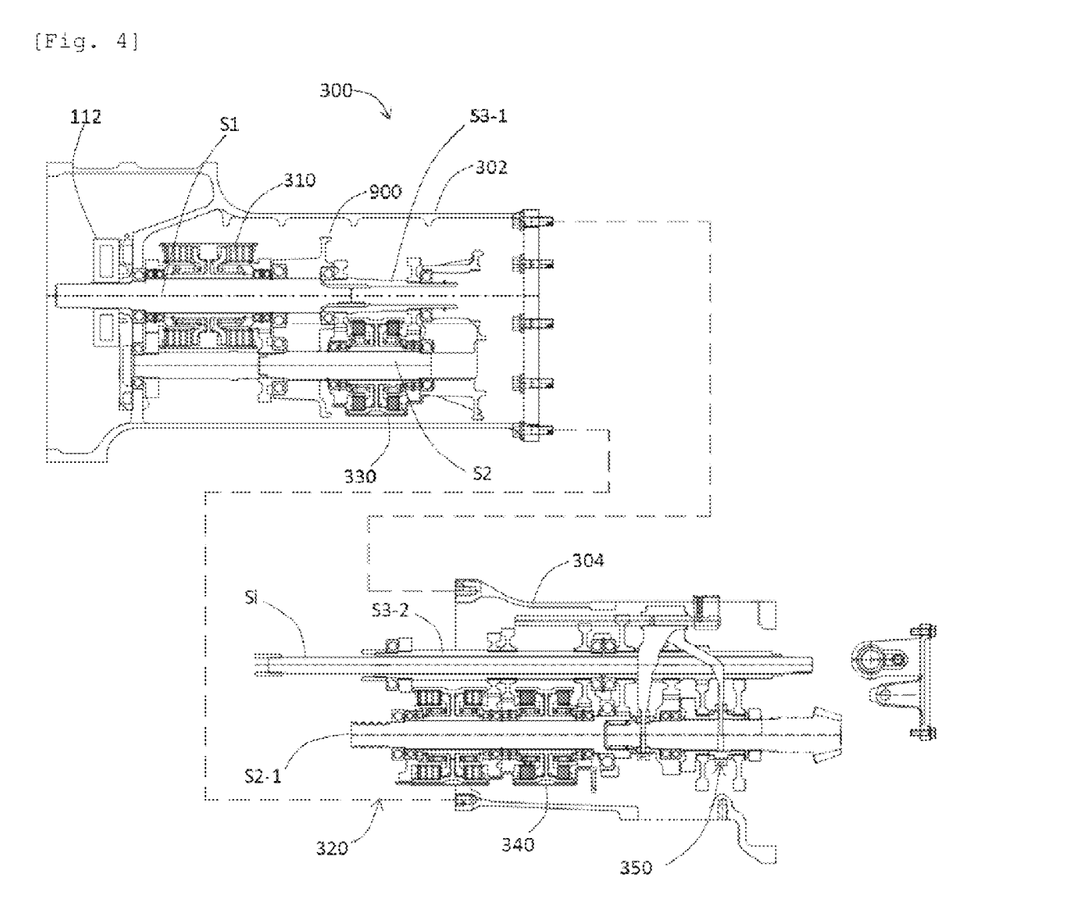
FIG. 4 is a view illustrating an assembly process of the transmission of FIG. 1.

FIG. 1 is a view illustrating a transmission according to an embodiment of the present disclosure and a work vehicle including the transmission, FIG. 2 is a view illustrating a power transmission structure of the work vehicle of FIG. 1, FIG. 3 is a view illustrating the internal structure of the transmission of FIG. 1, and FIG. 4 is a view illustrating an assembly process of the transmission of FIG. 1.

Referring to FIGS. 1 to 4, a work vehicle 100 according to the embodiment may include a driving source 110, rear wheels or first driving wheels 120, front wheels or second driving wheels 130, a user driving section 200, a transmission 300, a power extraction device 400, a shifting hydraulic valve device 500 for shifting, a PTO hydraulic pump device 600, and a PTO device 700.

The driving source 110 such as an engine generates power and power from the driving source 110 is shifted or controlled through the transmission 300 and can be used for running or work other than running.

The transmission 300 can transmit the entire or a portion of power transmitted from the driving source 110 to the first driving wheels 120 or the second driving wheels 130 for running, and power for work other than running can be transmitted to the PTO device 700. The power transmitted to the PTO device 700 can be transmitted from the driving source 110 that is an engine without shifting and rotation is possible at 540 rpm, 1000 rpm, or at a rotation speed (GSP) proportioned to a running speed with the driving source 110 generating maximum or optimum torque. Shifting in the PTO device 700 may be performed by a first shifting controller 735 using a shift clutch, etc.

To this end, the PTO device 700 may include a first power transmission unit 730 for multi-stage independent shifting. The first power transmission unit 730 can directly receive power from the driving source 110 regardless of the rotation direction of the switching unit 310 and shifting by the main shifting unit 320 and can shift and transmit power connected through the PTO clutch 720 to the PTO output shaft 710.

The user driving part 200 may include a driver seat 210, a steering wheel 220, a clutch pedal 230, a forward/backward operation unit 240, a main shifting operation unit 250, and a sub-shifting operation unit 260. A user can control the running direction of the work vehicle 100 through the handle 220, can control the rotation direction of the driving wheels through the forward/backward operation unit 240, and can control the shift stages, shift ranges, or the like through the main shifting operation unit 250 and the sub-shifting operation unit 260.

The clutch pedal 230 may be positioned at left side under the handle 220, a brake pedal may be provided at the right side, and a parking brake 280 may be provided under the driver seat 210. The brake pedal may be connected with a valve of a brake system that is operated by hydraulic pressure, and as the brake pedal is operated, a first brake 140 can be operated.

In this embodiment, the user driving section 200 may be provided in an exposed type, but, depending on cases, it may include a cabin 270.

The forward/backward operation unit 240 can proportionally control hydraulic pressure that is applied to the switching unit 310, etc. through the switching hydraulic valve device 800, and the main shifting operation unit 250 or the sub-shifting operation unit 260 can proportionally control hydraulic pressure that is applied to the high-speed/low-speed hydraulic clutch 330, the main shifting clutch 340, etc. through the shifting hydraulic valve device 500. In this process, operation types of a hydraulic type, an electric type, a manual type, or the like may be used in forward/backward switching and shifting control.

Power that has passed through the transmission 300 can be transmitted to the rear wheels, that is, the first driving wheels 120 through a first differential 360. Depending on cases, it is possible to extract a portion of power to a front-wheel output shaft 410 and transmit it to the front wheels, that is, the second driving wheels 130 through the driving extraction device 400. When the second driving wheels 130 receive power together with the first driving wheels 120 through the power extraction device 400, the work vehicle 100 can run in a four-wheel mode and the four-wheel mode can be usefully applied to move the work vehicle 100 on rough terrain, a rice field, a dry field, or the like, or to high-load pulling work. However, it may be efficient to run in a two-wheel mode rather than a four-wheel mode when running on a common road, etc., and in this case, the power extraction device 400 can switch to a two-wheel mode, in which the second driving wheels 130 are manually rotated, without transmitting power to the front-wheel output shaft 410.

The first brake 140 may be mounted between the first differential 360 and the first driving wheels 120. The first brake 140 can stop the work vehicle 100 by suppressing rotation of the first driving wheels 120 that mainly contribute to running. For reference, a pedal for operating the first brake 140 may be provided in the user driving section 200 and may be provided at a side or both sides of the driver seat.

Power from the engine can be connected to the first driving wheels 120, the second driving wheels 130, the PTO device 700, or the like through the transmission 300, and a switching unit 310, a main shifting unit 320, a sub-shifting unit 350, the first differential 360, etc. may be provided in the transmission 300.

Referring to FIG. 2, power from the driving source 110 can be transmitted to the switching unit 310 through a first shaft S1 and can be applied for forward or backward movement through the switching unit 310, and rotation of which the direction is set by the switching unit 310 can be transmitted to the main shifting unit 320 through a second shaft S2 at the lower portion.

The main shifting unit 320 may include a high-speed/low-speed hydraulic clutch 330 and a main shifting hydraulic clutch 340 that can perform adjustment from a first stage to a fourth stage. The sub-shifting unit 350 can additionally adjust a shifting section in rotation of shifted by the main shifting unit 320, and, as shown in the figure, can control a section A, B, C, or Cr (creep) using the shift clutch.

In this embodiment, the high-speed/low-speed hydraulic clutch 330 and the main shifting hydraulic clutch 340, which are hydraulic clutches using a friction plate, can be controlled by the shifting hydraulic valve device 500 for shifting, and the shift clutch of the sub-shifting unit 350 can be operated in an electric type or a hydraulic type. The transmission 300 according to this embodiment can shift up to 24 steps or 32 steps by the main shifting unit 320 and the sub-shifting unit 350.

A portion of power from the engine may be transmitted to the PTO device 700 without passing through the switching unit 310, the main shifting unit 320, or the like, and power transmitted to the POT device 700 can drive a tandem pump, etc. and can provide power for shifting the PTO device 700 or supplying a lubricant through the PTO hydraulic pump device 600. Power can be transmitted to the PTO output shaft 710 through the PTO clutch 720 and the first power transmission unit in the PTO device 700.

In addition, the other of the power from the engine may be transmitted to the PTO device 700 as well through the switching unit 310, the main shifting unit 320, or the like, and the power transmitted to the PTO device 700 may be transmitted at revolutions per minute proportioned to or corresponding to the running speed and can be used for work sensitive to a vehicle speed such as rice transplantation. Power that is synchronized with a vehicle speed can be transmitted to the PTO output shaft 710 through another power transmission unit in the PTO device 700.

A gear for extracting power to the outside may be mounted on the shaft on which the shift clutch is mounted in the sub-shifting unit 350, and a driving extraction gear 370 is provided at an end thereof. The driving extraction gear 370 may be partially exposed from the housing of the transmission 300 and the driving extraction device 400 may be mounted in the region in which the driving extraction gear 370 is exposed.

Referring to FIGS. 3 and 4, the inside of the transmission 300 may be provided by assembling the front housing 302, the transmission housing 304, and the differential housing from the front. In this embodiment, the switching unit 310 and the main shifting unit 320 of the high-speed/low-speed hydraulic clutch 330 be may accommodated in the front housing 301, and the main shifting hydraulic clutch 340 and the sub-shifting hydraulic clutch may be accommodated in the transmission housing 304.

The switching unit 310 is positioned on the first shaft S1 at the upper portion in the front housing 302, the high-speed/low-speed hydraulic clutch 330 may be provided on the second shaft S2 at the lower portion, and the first shaft S1 and the second shaft S2 may be supported by a shaft supporting member 900 in the front housing 302.

In the transmission housing 304 as well, the main shifting hydraulic clutch 340 and the sub-shifting unit 350 may be provided at the lower portion, and an internal shaft Si that can transmit driving of the engine to the PTO device 700 and a third shaft S3 that can transmit rotation of the main shifting unit 320 to the main shifting hydraulic clutch 340 from the high-speed/low-speed hydraulic clutch 330 may be provided at the upper portion.

The third shaft S3 may be formed by combining a part S3-1 of the third shaft in the front housing 302 and a part S3-2 of the third shaft in the transmission housing 304 with each other. A part S2-1 of the second shaft on which the main shifting hydraulic clutch 340 is mounted is positioned at the lower portion, but can receive rotation of the second shaft S2 at the forward portion through the third shaft S3.

When the front housing 302 and transmission housing 304 are combined, the first shaft S1 of the switching unit 310 accommodated in the front housing 302 and the internal shaft Si accommodated in the transmission housing 304 may be shaft-coupled to each other.

When the front housing 302 and transmission housing 304 are assembled to each other, front and rear housings and front and rear internal components can be connected to each other.

Figure 5:
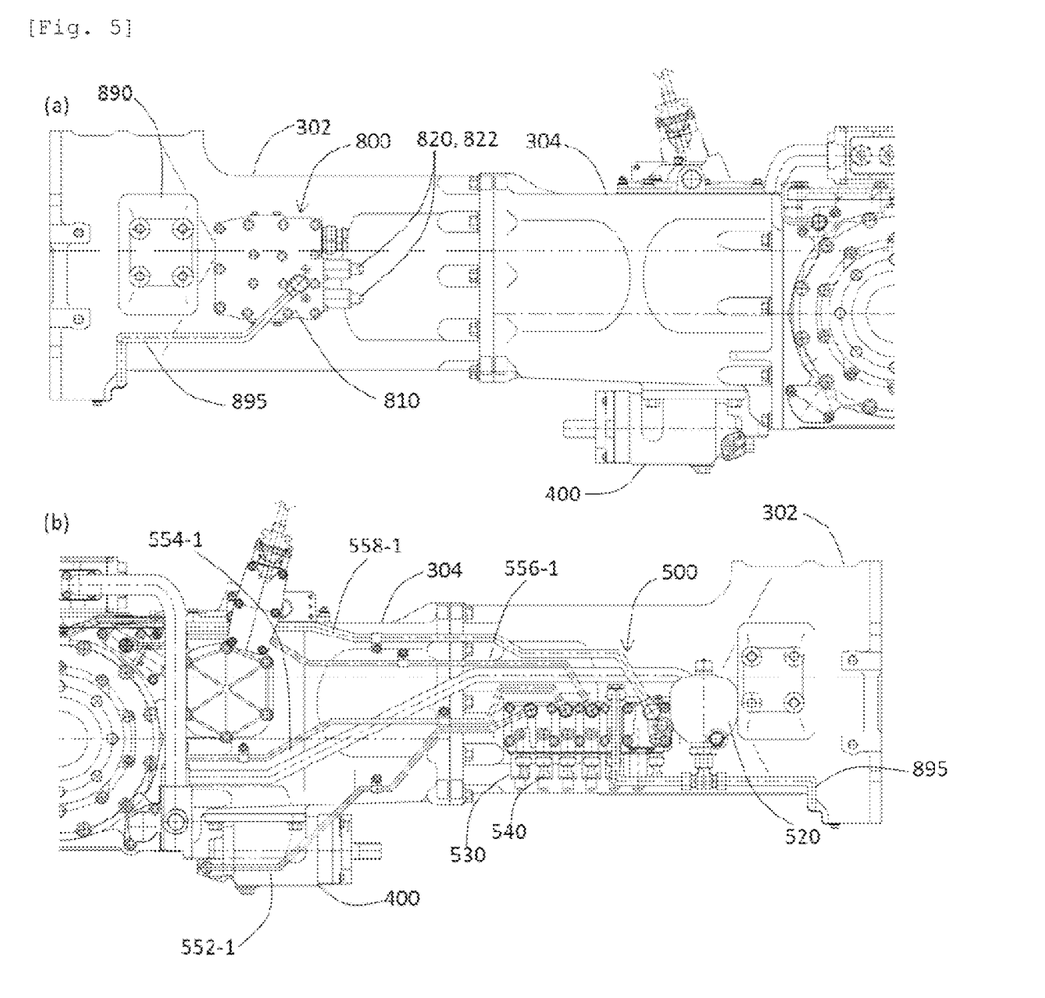
FIG. 5 is a view illustrating the transmission and a hydraulic valve device according to an embodiment of the present disclosure.
Figure 6:
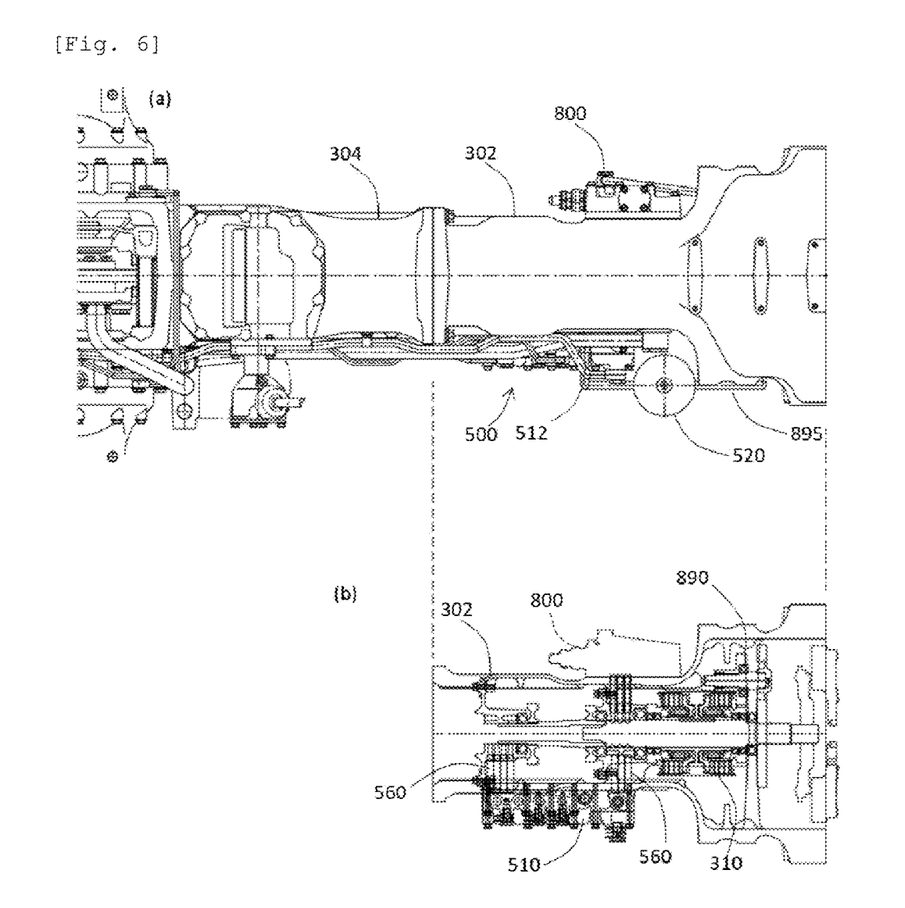
FIG. 6 is a view illustrating connection of the hydraulic valve device in the transmission of FIG. 5.
Figure 7:
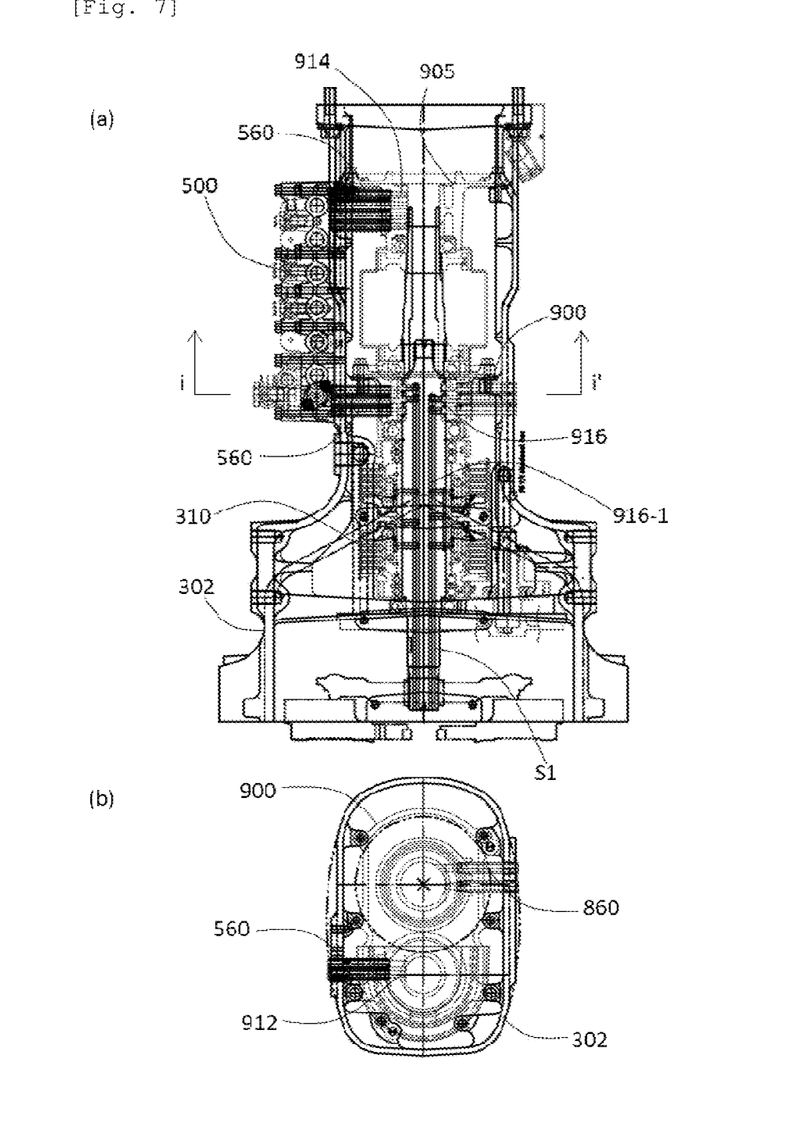
FIG. 7 is a view illustrating a supporting member of the transmission according to an embodiment of the present disclosure.
Figure 8:
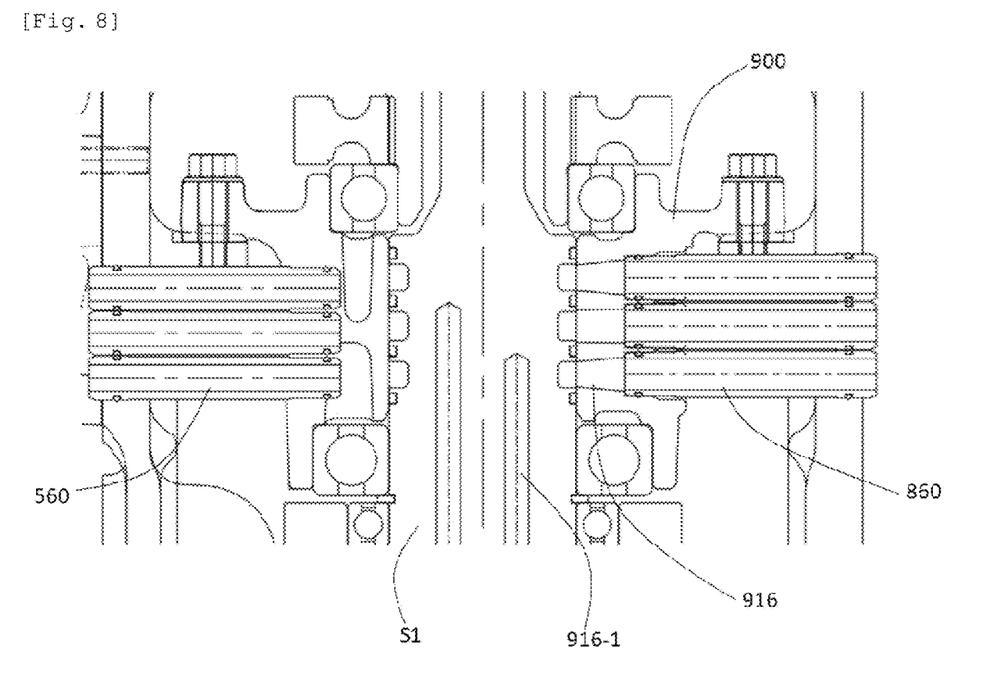
FIG. 8 is a view illustrating connection between the hydraulic valve device and the supporting member of FIG. 7.
Figure 9:
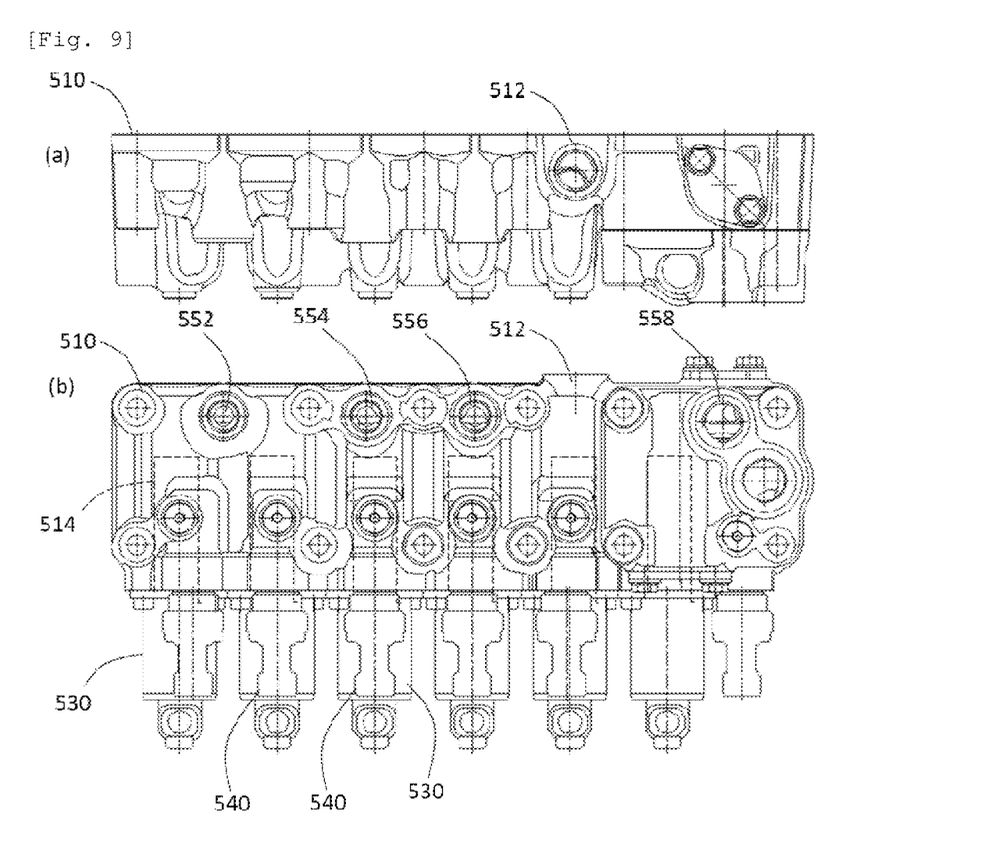
FIG. 9 is a view illustrating a shifting hydraulic valve device according to an embodiment of the present disclosure.
Figure 10:
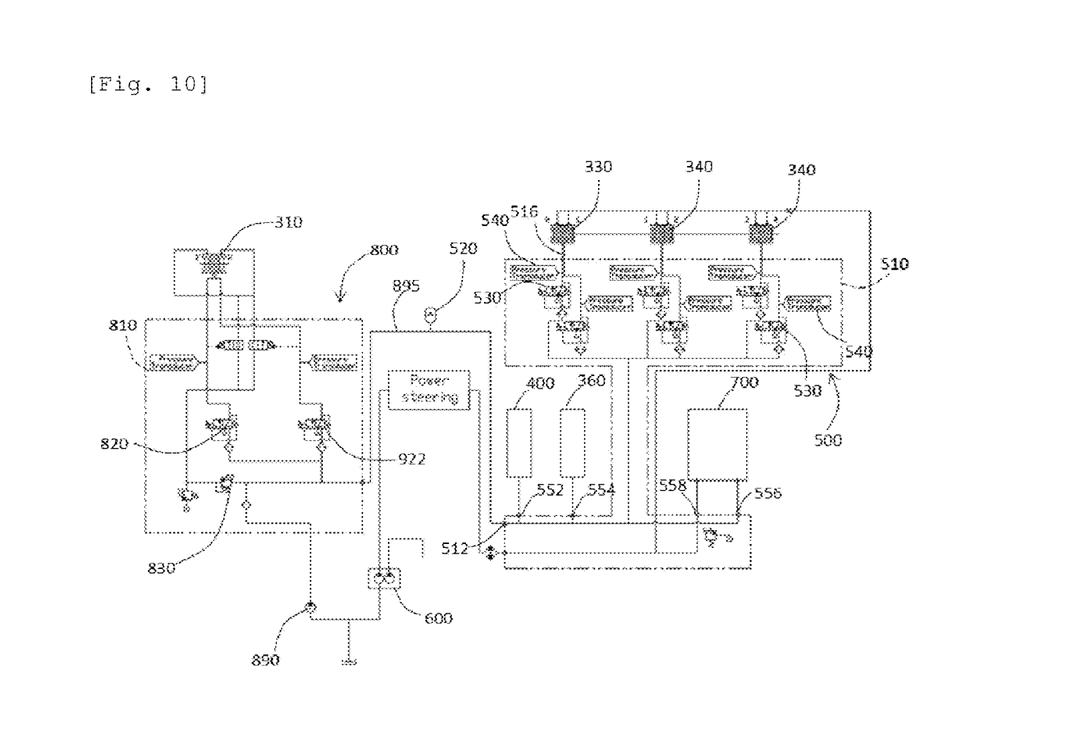
FIG. 10 is a view illustrating a hydraulic circuit of the transmission according to an embodiment of the present disclosure.

FIG. 5 is a view illustrating the transmission and a hydraulic valve device according to an embodiment of the present disclosure, FIG. 6 is a view illustrating connection of the hydraulic valve device in the transmission of FIG. 5, FIG. 7 is a view illustrating a supporting member of the transmission according to an embodiment of the present disclosure, FIG. 8 is a view illustrating connection between the hydraulic valve device and the supporting member of FIG. 7, FIG. 9 is a view illustrating a shifting hydraulic valve device according to an embodiment of the present disclosure, and FIG. 10 is a view illustrating a hydraulic circuit of the transmission according to an embodiment of the present disclosure.

Referring to FIGS. 5 to 10, in the transmission 300, a switching hydraulic valve device 800 is mounted on the left wall of the front housing 302 and the shifting hydraulic valve device 500 for shifting is mounted on the right wall. The shifting hydraulic valve device 500 is mounted in the transmission 300 to supply oil to the main shifting unit 320, and, in this embodiment, the high-speed/low-speed hydraulic clutch 330 and the main shifting hydraulic clutch 340 can supply controlled hydraulic pressure to hydraulic devices, respectively.

The shifting hydraulic valve device 500 may include a shifting valve block 510, an accumulator 520, and six shifting control valves 530, an oil inlet 512 may be formed at the upper portion of the shifting valve block 510, and a valve seat groove 514 for mounting the shifting control valves 530 may be formed at the lower portion opposite to the oil inlet 512. The oil inlet 512 and the valve seat groove 514 may be connected to each other, and the valve seat groove 514 is connected to an oil outlet 516 one to one and can be connected to the high-speed/low-speed hydraulic clutch 330 and the main shifting hydraulic clutch 340.

The shifting hydraulic valve device 500 according to the present disclosure can be supplied with oil that has passed through the switching hydraulic valve device 800 positioned opposite to the transmission 300. The shifting hydraulic valve device 500 is not supplied with oil directly from the hydraulic pump 890 and can be supplied with oil indirectly through the switching hydraulic valve device 800.

Accordingly, the shifting hydraulic valve device 500 according to the present disclosure may include the accumulator 520 for stable supply of oil and the accumulator 520 may be positioned between the switching hydraulic valve device 800, which is one of different hydraulic devices, and the oil inlet 512.

In this embodiment, the switching hydraulic valve device 800 may be mounted close to the first shaft S1 on the left wall of the front housing 302 and may be fixed at a relatively high position in comparison to the shifting hydraulic valve device 500.

The switching hydraulic valve device 800 may include a switching valve block 810 mounted on the left wall of the front housing 302, switching control valve 820 and 822 mounted on the rear surface of the switching valve block 810, and a first pipe 860 connecting the switching control valve 820 and 822 and a shaft supporting member 900.

The shifting hydraulic valve device 500 according to this embodiment is connected with the switching hydraulic valve device 800 through a connection pipe 895 detouring around the lower portion of the transmission, and the accumulator 520 is mounted in the path of the connection pipe 895. The switching hydraulic valve device 800 can be supplied with oil from the hydraulic pump 890 in the transmission 300.

As in FIG. 10, oil supplied from the hydraulic pump 890, which is a kind of working fluid, can be supplied to the switching unit 310 and the shifting hydraulic valve device 500 through the switching hydraulic valve device 800, and the oil supplied to the shifting hydraulic valve device 500 can be connected back to the hydraulic clutches 330 and 340 of the main shifting unit 320 and other hydraulic devices, for example, the clutch of the driving extraction device 300, an auto-lock of the differential 360, the PTO device 700, etc.

Referring to FIG. 9, six shifting control valves 530 may be mounted on the lower portion of the shifting valve block 510. The six shifting control valves 530 may be modularized with the shifting valve block 510 as a proportional control valve or an on-off control valve and mounted in the transmission 300. In this embodiment, the oil inlet 512 is formed at the upper portion and the shifting control valves 530 are mounted at the lower portion, whereby it is possible to prevent generation of abnormal operation even though air or vapor is produced in oil.

Further, a pressure sensor 540 is mounted on each of the shifting control valves 530, so it is possible to sense pressure feedback that is sensed from the hydraulic clutch.

A second pipe 560 coupled to the valve block at the oil outlet 516 may be further included. The second pipe 560 may be connected to the shaft supporting member 900 in the transmission 300 and is connected to the oil outlet 516 of the shifting valve block 510 at the outside, thereby being able to function as a passage through which oil is connected to the inside from the outside.

The shaft supporting member 900 is mounted in the front housing 302, provides a bearing that can support the first shaft S1 at the upper portion, and provides a bearing that can support the second shaft S2 at the lower portion. Accordingly, the first shaft S1, the second shaft S2, other hydraulic clutches 310 and 330, etc. can be supported by the shaft supporting member 900. FIG. 7(b) shows a cross-section of i-i' in (a), in which it can be seen that the shaft supporting member 900 is fixed in the front housing 302 and provides bearings that can support the first shaft S1 and the second shaft S2 at the upper portion and the lower portion, the first pipe 860 and the second pipe 560 are formed on walls facing each other, the first shaft 860 is formed at the upper portion to correspond to the first shaft S1, and the second pipe 560 is positioned at the lower portion to correspond to the second shaft S2.

Further, oil channels 912 and 914 for oil supplied from the shifting hydraulic valve device 500 may be formed in the shaft supporting member 900, and a channel for guiding oil supplied from the switching hydraulic valve device 800 to a channel 916-1 of the first shaft S1 may also be formed. As shown in FIGS. 7 and 8, channels 912, 914, and 916 transmitting oil through the pipes 560 and 860 are formed in the shaft supporting member 900, and channels 912 and 914 facing each other are different in valve devices connected to each other but may be formed in the same supporting member 900. Further, a channel 916-1 connected with the switching hydraulic valve device 800 is formed in the first shaft S1 so that a desired switching clutch 310 can be operated in accordance with operation of the switching control valves 820 and 822.

Similar to the channel 916-1 of the first shaft S1, a channel connected with the shifting hydraulic valve device 500 may also be formed in the second shaft S1, a channel connected from the channel 912 of the shaft supporting member 900 may be extended rearward and connected to the high-speed/low-speed hydraulic clutch 330, and a desired shifting clutch 330 can be operated in accordance with operation of the shifting control valve 530.

In this embodiment, the channel connected to the switching clutch 310 around the shaft supporting member 900 may extend forward along the first shaft S1, and the channel connected to the high-speed/low-speed hydraulic clutch 330 may extend rearward along the second shaft S2.

When the shifting control valve 530 is opened, the pressure sensor 540 can form pressure the same as the inside of the hydraulic clutches 330 and 340, and accordingly, can receive also feedback about whether the internal pressure of the hydraulic clutches 330 and 340 are in a normal range.

A plurality of through-holes corresponding to the second pipes 560, respectively, may be formed through the wall of the transmission 300 for passing the second pipes 560. The through-hole may be integrated into one hole in a size that can pass all of pipes, but the through-holes according to this embodiment may be separately formed to be able to support the second pipes 560, respectively, in order to stably support and guide the second pipes 560.

An interface for mounting and fixing the shifting hydraulic valve device 500 may be provided on the right side of the transmission 300 and a worker can insert a pipe into the interface through a through-hole and can mount the shifting valve block 510 of the shifting hydraulic valve device 500 on the transmission 300.

Oil connection holes 552, 554, and 556 that can be connected with different hydraulic devices may be formed at the shifting valve block 510. The oil connection holes 552, 554, and 556 may be connected with the oil inlet 512, oil flowing in the oil inlet 512 through the connection holes 552, 554, and 556 forms the same hydraulic pressure, and the shifting hydraulic valve device 500 may have a manifold structure for transferring oil to different hydraulic devices of the work vehicle or for forming hydraulic pressure.

As shown in FIG. 9(b), the oil connection holes 552, 554, and 556 may be connected with a pipe 552-1 connected with the driving extraction device 400 for front-wheel driving, a pipe 554-1 connected with the differential 360 for automatic differential lock, a pipe 556-1 connected with the hydraulic clutch 720 of the PTO device 700, etc. In addition, the oil connection hole 558 for supplying a lubricant may be connected with also a lubricant supply pipe 558-1 for supplying a lubricant, which is supplied through a cooler from a power steering system, to the PTO device 700. In this case, the lubricant can be supplied to the shifting valve block 510 through a path different from the oil inlet 512.

In this embodiment, since a relief valve 830 is provided to the switching hydraulic valve device 800, a relief valve may be omitted in the shifting hydraulic valve device 500. However, when the switching hydraulic valve device is a mechanical type, a relief valve may be formed at a right shifting hydraulic valve device. That is, a relief valve may be mounted on at least one of the switching hydraulic valve device and the shifting hydraulic valve device.

Although exemplary embodiments of present the disclosure were described above with reference to the drawings, it should be understood that the present disclosure may be changed and modified in various ways by those skilled in the art without departing from the spirit and scope of the present disclosure described in claims.

| Description of Reference Numerals | |
|---|---|
| 100: work vehicle | 110: driving source |
| 140: first brake | 200: user driving section |
| 300: transmission | |
| 500: shifting hydraulic valve device | |
| 510: valve block | 520: accumulator |
| 530: hydraulic control valve | |
| 540: pressure sensor | |
| 600: PTO hydraulic pump device | |
| 700: PTO device | |

The invention claimed is:

1. A transmission for a work vehicle that includes a switching clutch for switching to forward and backward movement and a shifting clutch for shifting, the transmission comprising:
 a first shaft having the switching clutch mounted thereon in a housing of the transmission;
 a second shaft rotating forward or backward within the housing, synchronized with the first shaft, and having the shifting clutch mounted thereon;
 a supporting member mounted in the housing and rotatably supporting the first shaft and the second shaft;
 a switching hydraulic valve device mounted on a first wall of the housing close to the switching clutch and controlling the switching clutch; and
 a shifting hydraulic valve device mounted on a second wall of the housing close to the shifting clutch and controlling the shifting clutch,
 wherein the switching hydraulic valve device and the shifting hydraulic valve device are connected to the switching clutch and the shifting clutch through channels formed in the supporting member,
 wherein the switching hydraulic valve device is supplied with oil from a hydraulic pump of the transmission, and then transfers the oil to the shifting hydraulic valve device through a connection pipe detouring around the transmission,
 wherein an accumulator is mounted in the path of the connection pipe connecting the switching hydraulic valve device and the shifting hydraulic valve device, in which all the oil from the switching hydraulic valve device passes through the accumulator before the shifting hydraulic valve device, and
 wherein the shifting hydraulic valve device has a manifold structure for transferring oil to different hydraulic devices of the work vehicle.

2. The transmission of claim 1, wherein the switching hydraulic valve device is mounted on a left wall of the housing close to the first shaft and the shifting hydraulic valve device is mounted on a right wall of the housing close to the second shaft.

3. The transmission of claim 1, wherein the switching hydraulic valve device includes a switching valve block mounted on the first wall of the housing, a switching control valve mounted on the switching valve block, and at least two first pipes connecting the switching hydraulic control valve and the supporting member.

4. The transmission of claim 1, wherein the shifting hydraulic valve device includes a shifting valve block mounted on the second wall of the housing, a plurality of shifting control valves mounted on the shifting valve block, and a plurality of second pipes connecting the shifting control valves and the supporting member.

5. The transmission of claim 4, wherein the shifting control valve is mounted on a lower portion of the shifting valve block, and
 the shifting hydraulic valve device includes a shifting oil inlet formed at an upper portion of the shifting valve block opposite to the shifting control valve.

6. The transmission of claim 1, wherein the housing includes a front housing and a transmission housing,
 the switching clutch and a high-speed/low-speed hydraulic clutch of the shifting clutch are accommodated in the front housing and a main shifting hydraulic clutch of the shifting clutch is accommodated in the transmission housing, and
 the switching hydraulic valve device and the shifting hydraulic valve device are mounted on an outer surface of a side of the front housing.

7. The transmission of claim 1, wherein an oil outlet of the switching hydraulic valve device is connected with an oil inlet of the shifting hydraulic valve device.

8. The transmission of claim 1, wherein a relief valve is mounted on at least one of the switching hydraulic valve device and the shifting hydraulic valve device.

* * * * *